United States Patent [19]

Milligan

[11] 3,906,319

[45] Sept. 16, 1975

[54] UNIVERSAL MOTOR SPEED CONTROL SYSTEM

[76] Inventor: Lee J. Milligan, 14 Cheri Ln., Fairfield, N.J. 07006

[22] Filed: Oct. 4, 1973

[21] Appl. No.: 403,645

[52] U.S. Cl. ............... 318/318; 318/327; 318/341
[51] Int. Cl. ............................................ H02p 5/06
[58] Field of Search.... 318/314, 318, 341, 326–328, 318/346, 348, 349, 357, 358, 359

[56] References Cited
UNITED STATES PATENTS

| | | | |
|---|---|---|---|
| 3,446,992 | 5/1969 | Webb | 318/341 |
| 3,621,354 | 11/1971 | Fawcett | 318/341 |
| 3,753,067 | 8/1973 | Milligan | 318/318 |

Primary Examiner—Robert K. Schaefer
Assistant Examiner—John J. Feldhaus
Attorney, Agent, or Firm—George E. Kersey

[57] ABSTRACT

A motor speed control system in which pulse signals with controlled gradually increasing amplitude levels are applied to a motor to maintain it at a desired speed under variable loading conditions. The system is suitable for controlling the speed of a wide variety of motors and is particularly advantageous for low inertia motors.

10 Claims, 10 Drawing Figures

3A — T2

3B — Pₛ

3C — T3

3D — P_c

3E — P_L

3F — T-4, Vmax, Bias

3G — T-5, Vmax, Bias

UNIVERSAL MOTOR SPEED CONTROL SYSTEM

BACKGROUND OF THE INVENTION

This invention relates to the control of electrical motor speed, and, more particularly, to the precision speed control of low inertia motors.

Precise control of motor speed is required where speed is to remain within prescribed limits regardless of loading conditions. For most motors, a suitable degree of control is achieved in accordance with the teachings of U.S. Pat. No. 3,753,067, issued Aug. 14, 1973. The circuitry of this patent is particularly suitable for medium and high inertia motors, which represent the majority of motors in modern commercial usage.

The "inertia" of a motor refers to the resistance to motion of its rotating parts, typically the rotor. The greater the concentration of mass away from the center of rotation, the greater is the motor inertia. When a motor has sufficient inertia, an abrupt change in motor speed can be compensated by a corresponding change in motor drive, which produces a smooth transition to the correct motor speed.

In the case of low inertia motors, on the other hand, the application of ordinary control signals tends to cause their rotors to gain speed too rapidly and overshoot the desired speed condition. Once the desired speed has been exceeded, no further control signal is applied until the motor drops below the desired speed. When the inertia of the motor is low and the load is large the drop in speed tends to be abrupt and below the desired speed condition. A further corrective signal then causes such an abrupt change in speed that the motor again overshoots the desired condition. The result can be that the motor never attains the desired operation condition, where it is "locked" to a specified speed.

It is consequently an object of the invention to achieve precision speed control of electrical motors. A related object is to achieve precision speed control of motors regardless of their inertia. Another related object is to achieve precision speed control for low inertia motors.

A further object of the invention is to adapt speed control systems which are suitable for certain kinds of motors to the control of other kinds of motors. A related object is to adapt speed control systems to the control of low inertia motors. Another related object is to provide circuitry which may be selectively applied to modify speed control systems, including modifications which permit precision speed control of low inertia motors.

A still further object is to limit the extent of departures from a desired speed condition when a corrective signal is applied to an electrical motor. A related object is to limit the extent of overshoot in speed when a corrective signal is applied, particularly in the case of a low inertia motor. Another related object is to achieve precision control over the transducer by which power is applied to the motor. A companion object is to limit the incidence of erroneous control signals at the transducer.

Yet another object of the invention is to achieve compact, efficient, and reliable circuitry for the universal speed control of electrical motors.

SUMMARY OF THE INVENTION

In accomplishing the foregoing and related objects, the invention provides a motor speed control system in which pulse drive signals applied to an electrical motor are controlled in amplitude during each pulse interval. In particular the pulse drive signals are tailored in amplitude to achieve the desired speed condition without subjecting the motor to excessive drive and attendant overshoot.

In accordance with one aspect of the invention, the pulse drive amplitude controller is used in conjunction with circuitry that is otherwise suitable for the speed control of medium and high inertia motors. The controller can be of an integrated circuit, plug-in type which permits the realization of universal speed control, but which is readily removable when low inertia motor control is not needed.

In accordance with another aspect of the invention, the controller is used in conjunction with circuitry which produces an error signal when there is a deviation in motor speed from a desired level. Such an error signal can be realized by using a reference signal generator to represent a desired condition of a motor, and a tachometer on the motor to produce an indicator signal representing the actual condition of the motor. The reference and indicator signals are then compared and an error signal is generated when there is a failure of comparison. The error signal can be applied directly to a motor drive unit to produce control pulses in the case of most motors, or it can be applied to the controller in the case of low inertia motors.

In particular, the controller transforms error signals which exhibit relatively abrupt transitions in level into pulses which gradually increase in amplitude in a controlled fashion in order to assure that gradual excitation is applied to the motor. As a result, the motor is subjected to a gradual increase in control that helps prevent an overshoot in attainment of the desired operating condition.

In accordance with a further aspect of the invention, the controller produces a stepped control signal with steps that decrease to an upper limit level. The steps are advantageously produced by a digital counter which is reset to commence counting whenever an error condition is detected. The output of the counter is applied to a decoder which translates the digital count to an output on successive leads according to the level of the count. This, in turn, produces a short circuiting effect on successive sections of an output ladder network so that the result is a stepped wave that decreases to a cutoff level which is preset according to the level at which no further increase in amplitude is to take place.

In accordance with still another aspect of the invention, an inhibit signal is applied to the motor drive unit during those intervals when the motor is operating at proper speed. This prevents any accidental motor drive output when the motor is operating properly.

In accordance with yet another aspect of the invention, the stepped wave produced by the controller is applied to an FET transistor which provides desired isolation between the controller and the motor drive transistors. Because of the inductance of the motor windings, the stepped control signal is converted into a gradually increasing pulse which commences at a desired amplitude level and assymptotically approaches a maximum level during each pulse interval. If the pulse interval is of sufficient duration the limit of the assymptote is attained. The control pulses begin at a prescribed amplitude level, which can be zero, or can be superimposed on a bias level of the kind described in U.S. Pat. No. 3,753,067.

Other aspects of the invention will become apparent after considering several illustrative embodiments, taken in conjunction with the drawings in which.

DETAILED DESCRIPTION

Figure 1:
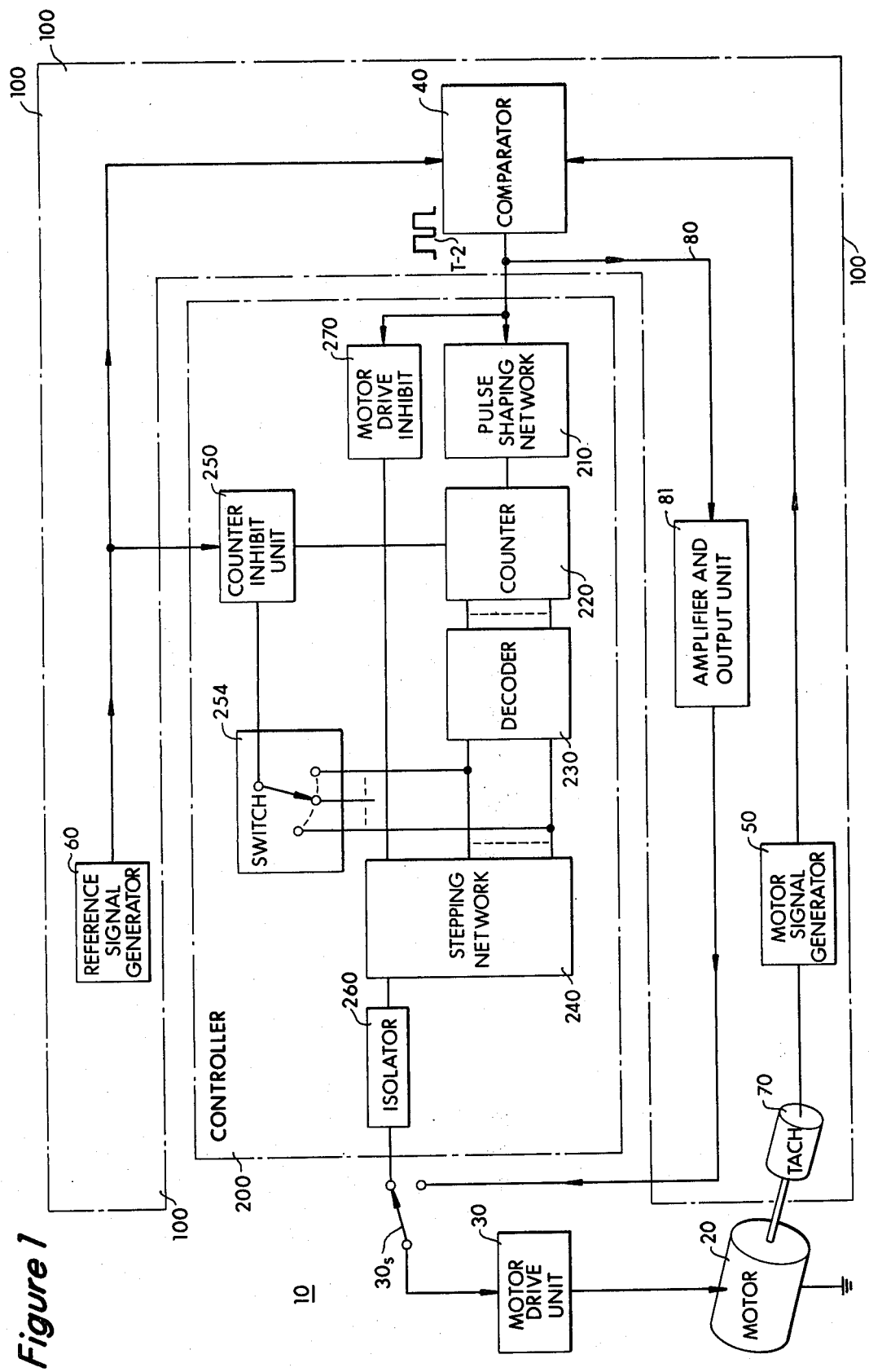
FIG. 1 is a block diagram of a speed control system employing a controller in accordance with the invention.

Turning to the drawings, the speed control system 10 of FIG. 1 for an electrical motor 20 includes a unit 30 for applying drive, a network 100 for indicating when the drive is to be applied, and a controller 200 for selectively modifying the effect of the network 40 on the drive unit 30. The particular kind of drive that is applied depends upon the motor and its operating conditions and is described in detail below.

The controller provides a stepped control signal which is used to produce assymptotically increasing pulse signals that are either applied directly to the motor 20 or used to increment a bias voltage that is applied to the motor 20 in accordance with the teachings of U.S. Pat. No. 3,753,067. The motor 20 may take any of a wide variety of forms, for example being of the brush or brushless type.

Even when the motor 20 is operating without an external load, it has a motor drive signal applied. This is because the internal loading of the motor, due to windage and friction alone.

As shown in FIG. 1, an error signal that indicates the motor has departed from a desired speed condition is applied from the network 100 directly over a line 80 or to the controller 200.

In the error signal generator 100 an indication of motor operating condition is produced by a tachometer 70, which may be as shown in U.S. Pat. No. 3,753,067. The output from the tachometer is applied to a motor signal generator 50, which may also be in accordance with the aforementioned U.S. Patent. The output of the motor signal generator 50 is applied as one input of a comparator 40, which may be as set forth and described in the patent. The other input originates at a reference signal generator 60, which may also be in accordance with the patent.

It will be appreciated that numerous other forms of comparator, generator, etc., may be employed.

Figure 3:
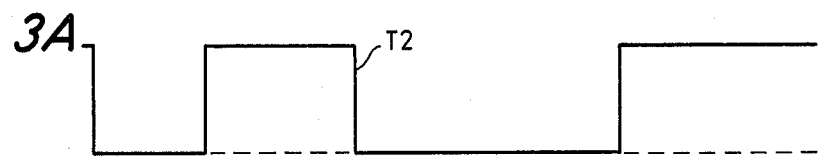
FIG. 3 is a set of graphs illustrating the operation of the speed control system of FIG. 1.
Figure 3:
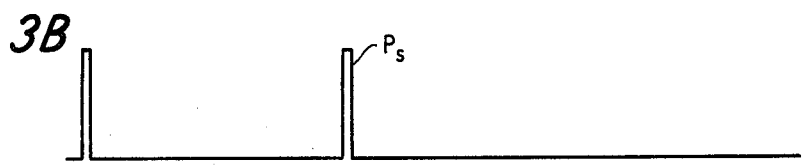
Figure 3:
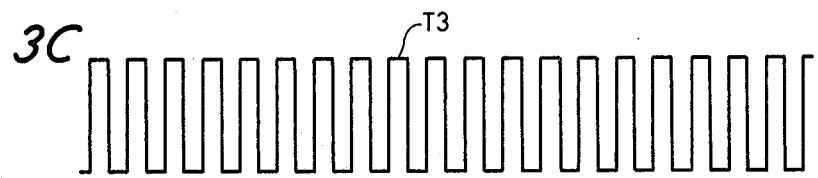
Figure 3:
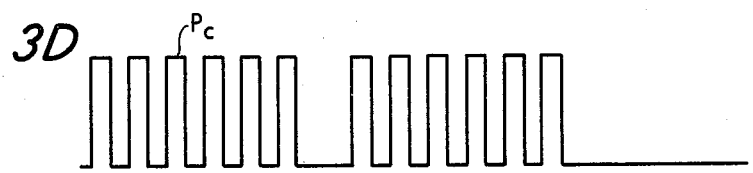
Figure 3:
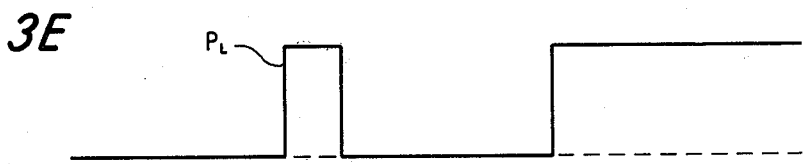
Figure 3:
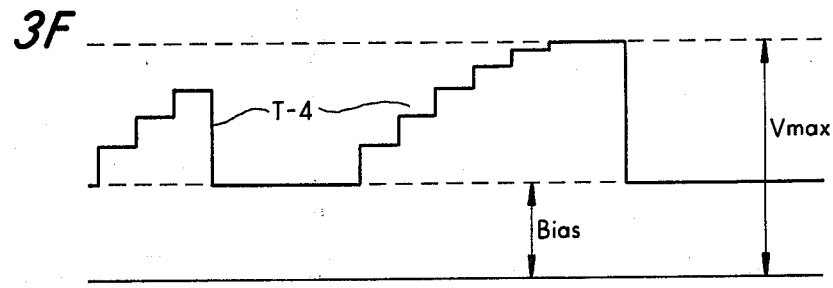
Figure 3:
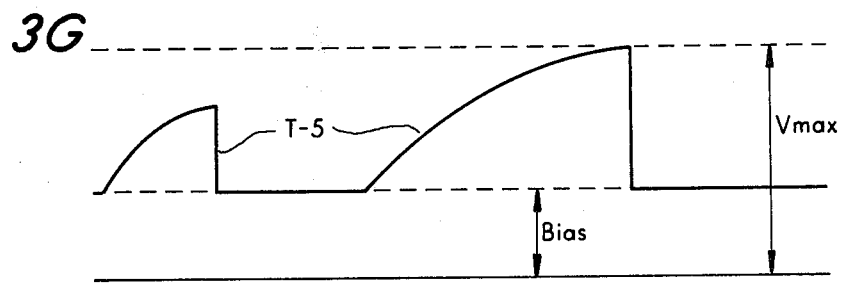

The output of the comparator 40 is a train of pulse signals which are illustrated by the wave form T-2 in FIGS. 1 and 3A. In the particular embodiment of FIG. 1, the train is at ground level during intervals when there is a departure from a desired speed condition. It will be appreciated that the train could be above ground during those intervals and the circuitry would be modified accordingly. The train T-2 can be applied over line 80 to the motor drive unit 30 through an amplifier and output unit 81 if the setting of the drive switch $30_s$ is changed. However, if the motor 20 is of the low inertia type the error signal is modified by the controller 200 and the switch $30_s$ has the setting shown.

In the controller 200 the error signal from the comparator is first applied to a pulse shaping network 210, which produces a narrow control pulse or spike $P_s$ in FIG. 3B at the trailing edge of each pulse of the train T-2. As noted previously for the particular embodiment of FIG. 1, the output of the comparator 40 is at a ground or zero reference level during those intervals when a drive signal is to be applied to the motor 20. This keeps the error control at ground level and facilitates switching of the motor drive unit 30. It will be understood that the error control may instead employ positive (or negative) going levels for which case the circuitry is tailored accordingly.

The pulse spikes $P_s$ which are produced as the comparator output goes to ground are used to activate a counter 220, which receives an applied train of pulse signals T-3 in FIG. 3C, from the reference signal generator 60. As noted in U.S. Pat. No. 3,753,067 the reference signal generator is produced by a relatively high frequency oscillator, which is chosen for stability and has an output that is subsequently divided to the value desired. The pulse T-3 is appropriate as a "clock" for the counter 220. The output from the counter 220, in binary, is applied to a decoder 230.

The decoder 230 produces a control level on successive output leads connected to a stepping network 240. The result is a pulse train T-4 shown in FIG. 3F, with steps of successively decreasing amplitude to a limit value Vmax determined by a decoder controlled counter inhibit unit 250. When the count reaches a prescribed level, a corresponding output from the decoder 230 applies a limit pulse $P_L$ in FIG. 3E to the inhibitor to terminate the operation of the counter 220 until a subsequent reset spike $P_s$ is generated. During the interval that a limit pulse $P_L$ is generated the output of the stepping network 240 remains constant. The output of the controller 200 is through an isolator 260 and results in drive pulses of the train T-5 in FIG. 3G. The pulses of the train T-5 are smoothed by the inductance of the motor windings.

In addition a motor drive inhibit unit 270 is included in the controller 200 and acts through the stepping network 240 in conjuction with the isolator 260 to prevent the inadvertent application of a control signal to the motor drive unit 30 during those intervals when no control is to be exercised and the motor 20 is operating in the desired way.

Figure 2A:
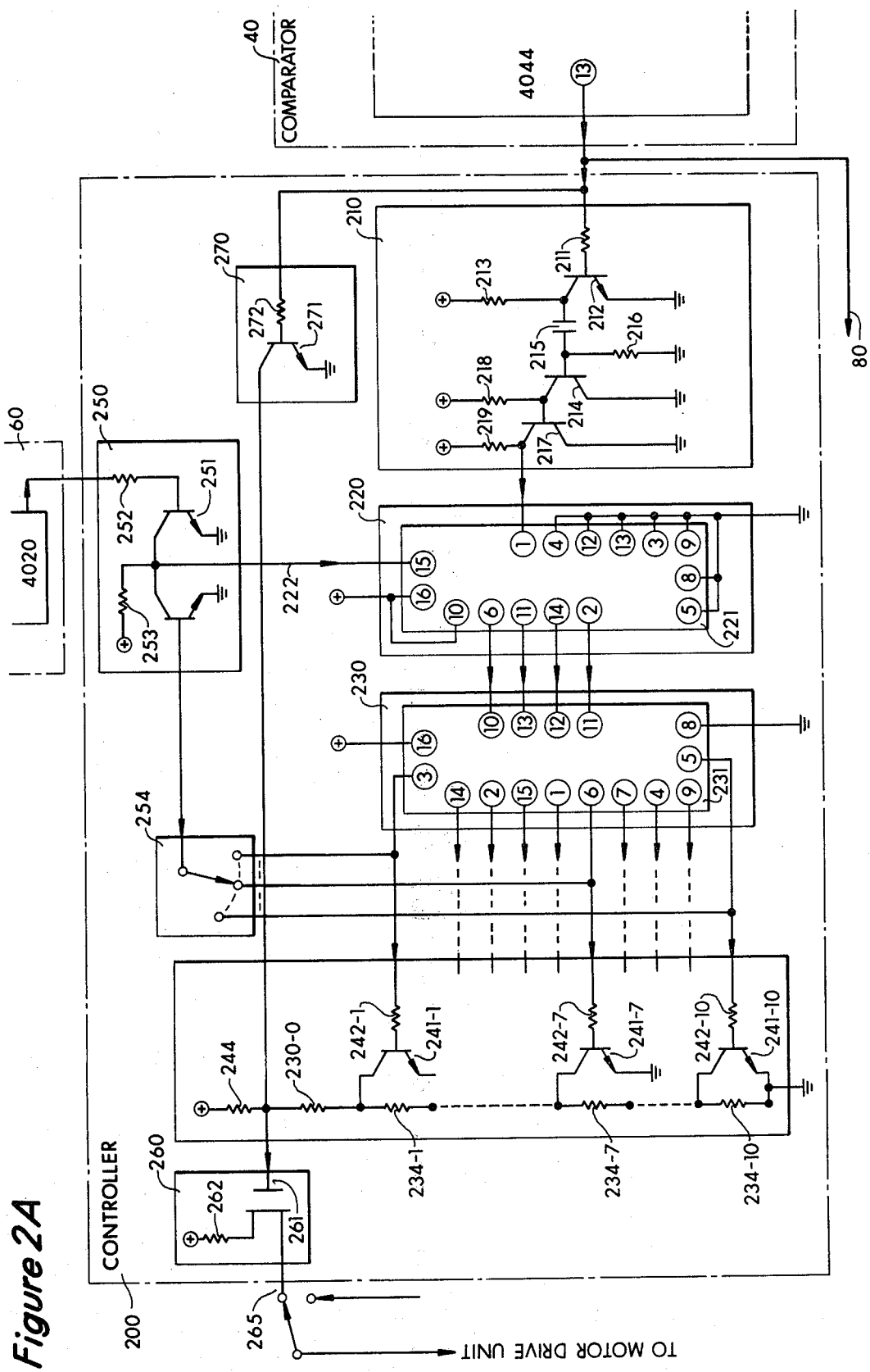
FIG. 2A is a circuit diagram of the controller of FIG. 1.

Details of representative circuitry for the controller 200 are set forth in FIG. 2A. In a tested embodiment of the invention the train T-2 (FIG. 3A) was applied to the squaring and level shifting network 210 from pin 13 of a 4044 integrated circuit chip through a resistor 211 of 10,000 ohms. The input transistor 212 was operated through a resistor 213 of 1,000 ohms and coupled to a second stage transistor 214 through a capacitor 215 of 0.0047 microforads and a resistor 216 of 47,000 ohms. The second stage transistor 214 and the output transistor 217 were connected to respective resistors 218 and 219 of 47,000 ohms each.

The counter 220 was formed by a 4029 COSMOS integrated circuit chip 221 with connections as shown to a decoder 230 in the form of a 4028 COSMOS integrated circuit chip 231. The reset pulses to the counter 220 are applied to pin 1 of the chip 221 and the binary count output appear at leads connected to pins 6, 11, 14, and 2 which are connected to pins 10, 13, 12, and 11 of the decoder chip 231. It will be appreciated that the counter and decoder may be a single unit.

The clock pulses for the counter 220 were obtained from a COSMOS 4020 divider chip in the reference signal generator 60, and shown in U.S. Pat. No. 3,753,067, through a buffer transistor 251 and associated resistors 252 and 253 of 10,000 and 5,000 ohms, respectively, in the inhibit unit 250.

The clock pulses are applied from the buffer transistor 251 to the counter 220 over a clock lead 222.

The various outputs of the decoder chip 231 were applied to respective transistors 241-1 through 241-10 through associated resistors 242-1 through 242-10 of 10,000 ohms each. Illustratively the sixth decoder chip output from pin 7 was also applied through a switch 254 to a transistor 255 in the inhibit unit 250. Thus, on the sixth count, the clock line 220 was disabled. It will be appreciated that the disablement can take place on other counts in accordance with the setting of the switch 254. The various transistors 241-1 through 241-10 in the stepping network 240 were connected to taps of a chain of resistors 243-1 through 243-10, each of 15,000 ohms. The chain was completed by an additional resistor 243-0 of 15,000 ohms, and bias was applied through a resistor 244 of 27,000 ohms.

The output from the stepping network 240 was applied over a lead 245 to the isolator 260, which took the form of a field-effect transistor 261 of the 3N128 type and an associated resistor of 10,000 ohms.

Also applied to the isolator 260 was an inhibit output connected to lead 245 by lead 275 from the inhibit unit 270 containing a transistor 271 and associated resistor 272 of 10,000 ohms.

Figure 2B:
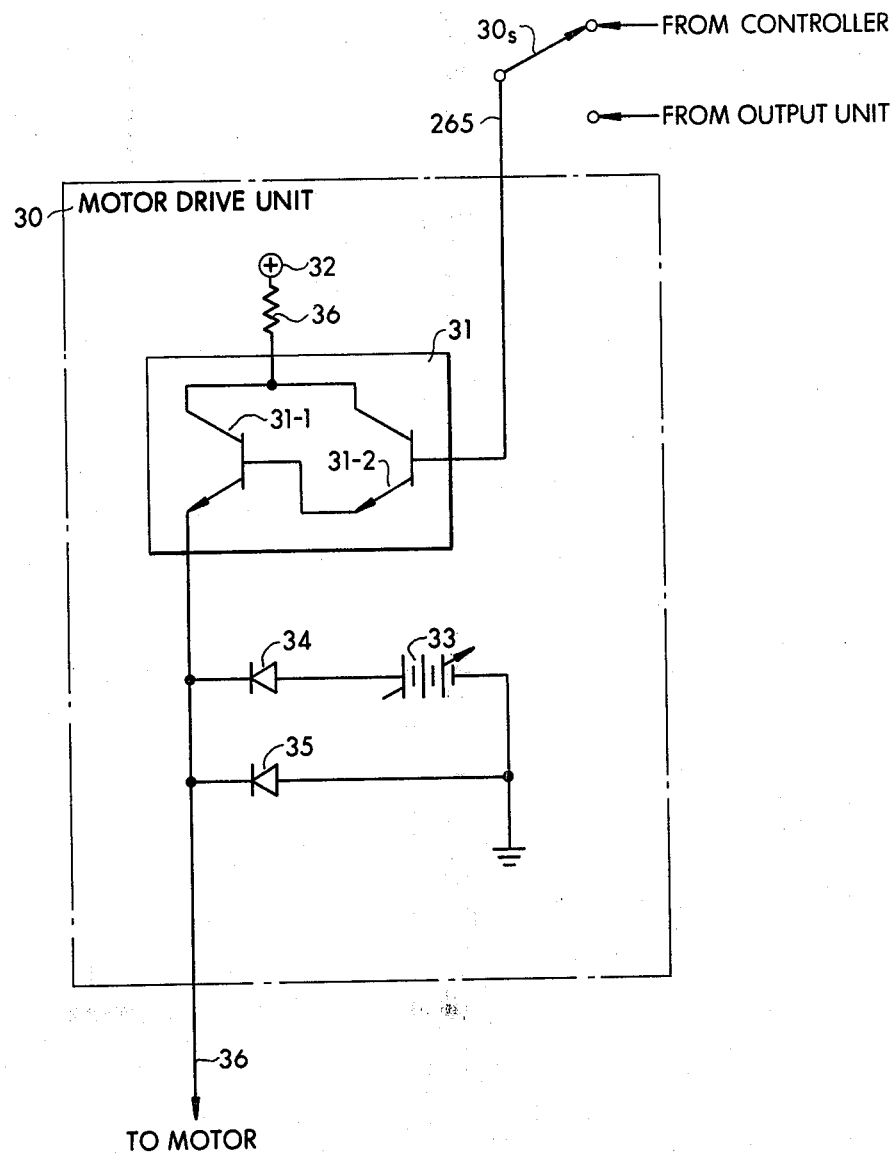
FIG. 2B is a circuit diagram of the motor drive unit of FIG. 1.

The output from the isolator 260 was applied by lead 265 to the motor drive unit 30 detailed in FIG. 2B.

In the drive unit 30, the power transducer was a pair of power transistors 31 of the type MJ 3,000. The power from a source 32 was controlled by the transducer 31 to which a control signal can alternatively be applied by the amplifier and output switch unit 81 when the switch 30$_s$ (FIG. 1) is set in its alternate position. The drive unit 30 also included a bias voltage source 33 and a blocking diode 34 in accordance with U.S. Pat. No. 3,753,067, and a motor protection diode 35.

With the switch 30$_s$ set as shown in FIG. 1, the output to the motor 20 on the lead 36 of FIG. 2B is in accordance with the pulse train T-5 of FIG. 3G because of the smoothing effect of the motor windings.

While various aspects of the invention have been set forth by the drawings and the specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A system for controlling the speed of a motor, comprising means for generating an error signal indicative of a departure of the motor from a specified speed condition, and means responsive to the error signal for producing a plurality of increasing discrete and different drive levels during the time when the motor speed is below said specified speed, and means for applying said drive levels to said motor.

2. A motor speed control system in accordance with claim 1 wherein
   the error signal generated means comprises means for representing a desired condition of the motor, means for representing the actual condition of said motor, and means for comparing the representations of the desired and actual conditions of the motor.

3. A motor speed control system in accordance with claim 1 wherein
   the drive level applying means comprises a power transducer having a control terminal connected to the producing means, an input terminal connectable to a power source, and an output terminal connectable to said motor, and means for applying a bias voltage at the output terminal of said power transducer.

4. a motor speed control system in accordance with claim 1 wherein
   the producing means comprises means for generating staircase pulse signals, and means for isolating the stepped pulse signals from the pulse drive level applying means.

5. A motor speed control system in accordance with claim 4 wherein
   the isolating means comprises a field-effect transistor.

6. A motor speed control system in accordance with claim 4 wherein
   the staircase signal generating means comprises means for generating a stepped wave with successively decreasing steps.

7. A motor speed control system in accordance with claim 6 wherein
   the staircase signal generating means comprises means for generating successive pulse signals which appear on successive control leads and are applied to the isolating means during selected error intervals.

8. A motor speed control system in accordance with claim 6 wherein
   the staircase signal generating means includes means for controlling the maximum number of steps in said stepped wave.

9. A motor speed control system in accordance with claim 7 wherein
   the means for generating successive pulse signals includes a counter connected to said error signal and a decoder connected to said counter.

10. A motor speed control system in accordance with claim 8 wherein
    the step control means includes means connected to a decoder for inhibiting a counter.

\* \* \* \* \*